(12) United States Patent
O'Donovan

(10) Patent No.: US 10,606,925 B2
(45) Date of Patent: Mar. 31, 2020

(54) RESPONSIVE GRID LAYOUTS FOR GRAPHIC DESIGN

(71) Applicant: Adobe Inc., San Jose, CA (US)

(72) Inventor: Peter Evan O'Donovan, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/644,265

(22) Filed: Jul. 7, 2017

(65) Prior Publication Data

US 2018/0276182 A1    Sep. 27, 2018

Related U.S. Application Data

(60) Provisional application No. 62/477,333, filed on Mar. 27, 2017.

(51) Int. Cl.

| G06F 3/048 | (2013.01) |
| G06F 17/21 | (2006.01) |
| G06F 3/0484 | (2013.01) |
| G06F 3/0482 | (2013.01) |
| G06F 3/0481 | (2013.01) |
| G06F 9/451 | (2018.01) |

(52) U.S. Cl.
CPC .......... *G06F 17/212* (2013.01); *G06F 17/211* (2013.01); *G06F 3/0482* (2013.01); *G06F 3/04817* (2013.01); *G06F 3/04845* (2013.01); *G06F 9/451* (2018.02); *G06F 2203/04803* (2013.01)

(58) Field of Classification Search
CPC .. G06F 17/248; G06F 17/212; G06F 17/2247; G06F 17/217; G06F 17/24; G06F 2203/04803; G06F 3/04845; G06F 3/0482; G06F 3/04817; G06F 9/451
See application file for complete search history.

(56) References Cited

U.S. PATENT DOCUMENTS

| 5,335,290 | A | * | 8/1994 | Cullen | G06K 9/00456 358/1.9 |
| 5,517,621 | A | * | 5/1996 | Fukui | G06F 17/212 715/210 |
| 9,875,229 | B2 | * | 1/2018 | Ying | G06F 17/248 |
| 2002/0116417 | A1 | * | 8/2002 | Weinberg | G06F 17/243 715/212 |
| 2008/0215964 | A1 | * | 9/2008 | Abrams | G06F 17/21 715/246 |

(Continued)

*Primary Examiner* — Wilson W Tsui
(74) *Attorney, Agent, or Firm* — SBMC

(57) ABSTRACT

Responsive grid layouts for graphic design are described. In one example, a system of a digital medium environment is configured to generate responsive grid layouts for graphic design. The system includes a layout module implemented at least partially in hardware of the computing device to generate a plurality of grid layouts each having at least one cell configured to be mapped to at least one design element of digital content. The system also includes a scoring module implemented at least partially in hardware of a computing device to assign scores to the plurality of grid layouts based on aesthetic criteria and an output module implemented at least partially in hardware of a computing device to output at least one grid layout of the plurality of grid layouts for recommendation to a user based on the scores.

20 Claims, 12 Drawing Sheets

(56) References Cited

U.S. PATENT DOCUMENTS

| | | | |
|---|---|---|---|
| 2010/0095204 A1* | 4/2010 | Kobayashi | G06F 17/211 |
| | | | 715/700 |
| 2010/0251104 A1* | 9/2010 | Massand | G06F 17/2264 |
| | | | 715/249 |
| 2010/0275152 A1* | 10/2010 | Atkins | G06F 17/212 |
| | | | 715/788 |
| 2011/0035661 A1* | 2/2011 | Balinsky | G06F 17/21 |
| | | | 715/243 |
| 2013/0021377 A1* | 1/2013 | Doll | G09G 5/14 |
| | | | 345/649 |
| 2014/0075289 A1* | 3/2014 | Brant | G06F 17/217 |
| | | | 715/234 |
| 2016/0170584 A1* | 6/2016 | Kumar | G06F 3/013 |
| | | | 715/811 |

* cited by examiner

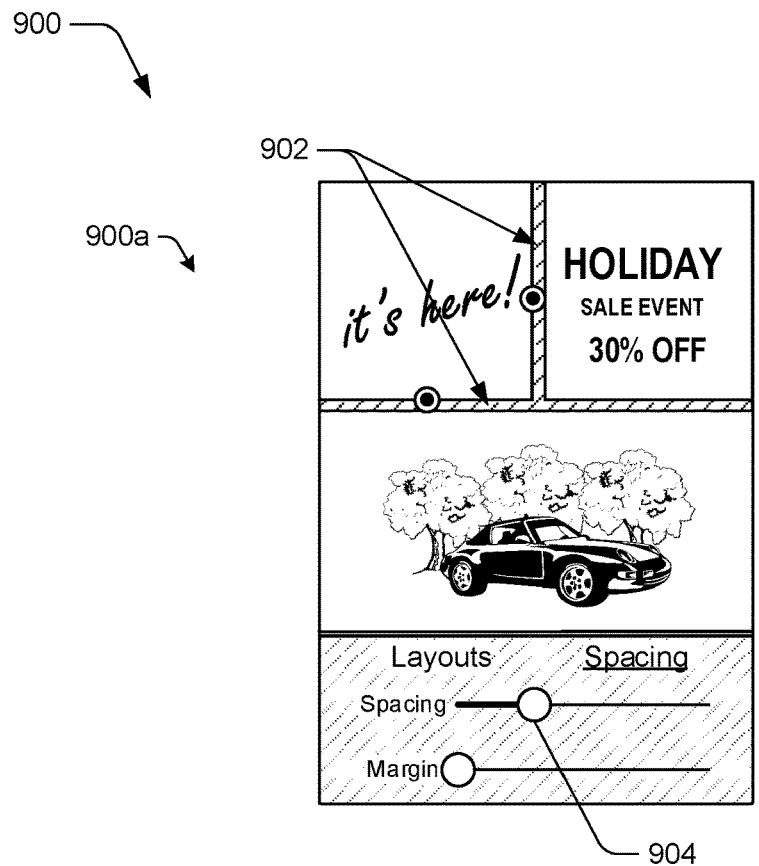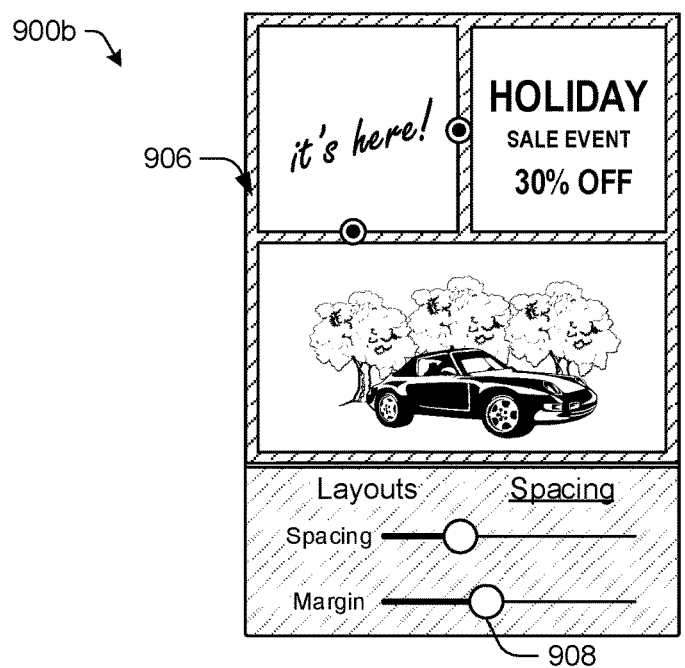
Fig. 9

RESPONSIVE GRID LAYOUTS FOR GRAPHIC DESIGN

RELATED MATTERS

This application claims priority under 35 U.S.C. Section 119(e) to U.S. Provisional Application No. 62/477,333, filed Mar. 27, 2017, and titled "Responsive Grid Layouts for Graphic Design," the entire disclosure of which is hereby incorporated by reference.

BACKGROUND

Applications have been developed to enable users to generate graphic designs (e.g., flyers, advertisements, posters, and so on). Generally, these applications fall into two categories: high-end applications and simple consumer applications. The high-end applications (e.g., Illustrator™, Photoshop™, Indesign™) give users a great deal of control but do not provide much assistance to the users. For example, there is little intelligence built into the applications to provide algorithmic assistance to the users, requiring a large amount of manual tedious work by the users to create the graphic designs. Simple consumer applications (e.g., Canva™, Pixel77™, simple photo-collage applications for mobile devices) also have little algorithmic assistance for helping users create graphic designs. Because of these limitations in conventional graphic design applications, creating simple graphic designs is a challenging task for novices.

SUMMARY

Responsive grid layouts for graphic design are described. In one example, a plurality of grid layouts are generated using existing content. The grid layouts include cells that can be mapped to at least one design element of digital content. Scores are assigned to the grid layouts based on various aesthetic criteria to determine the "best" grid layouts for the content. Then, at least one grid layout is output for recommendation to a user based on the scores.

In another example, a user can manipulate a first grid cell of a grid layout of a graphic design, such as by changing its size, and in response, the first grid cell is dynamically modified. Then, a second grid cell adjacent to the first grid cell is automatically modified, such as by changing its size relative to the change in size of the first grid cell. Based on the modifications to both the first and second grid cells, the system automatically adjusts, in real time, at least one parameter of content displayed within the first grid cell and at least one parameter of content displayed within the second grid cell.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 9 illustrates an example implementation of a user interface output by the computing device in which spacing and margins of the grid layout are adjusted.

DETAILED DESCRIPTION

Overview

Figure 1:
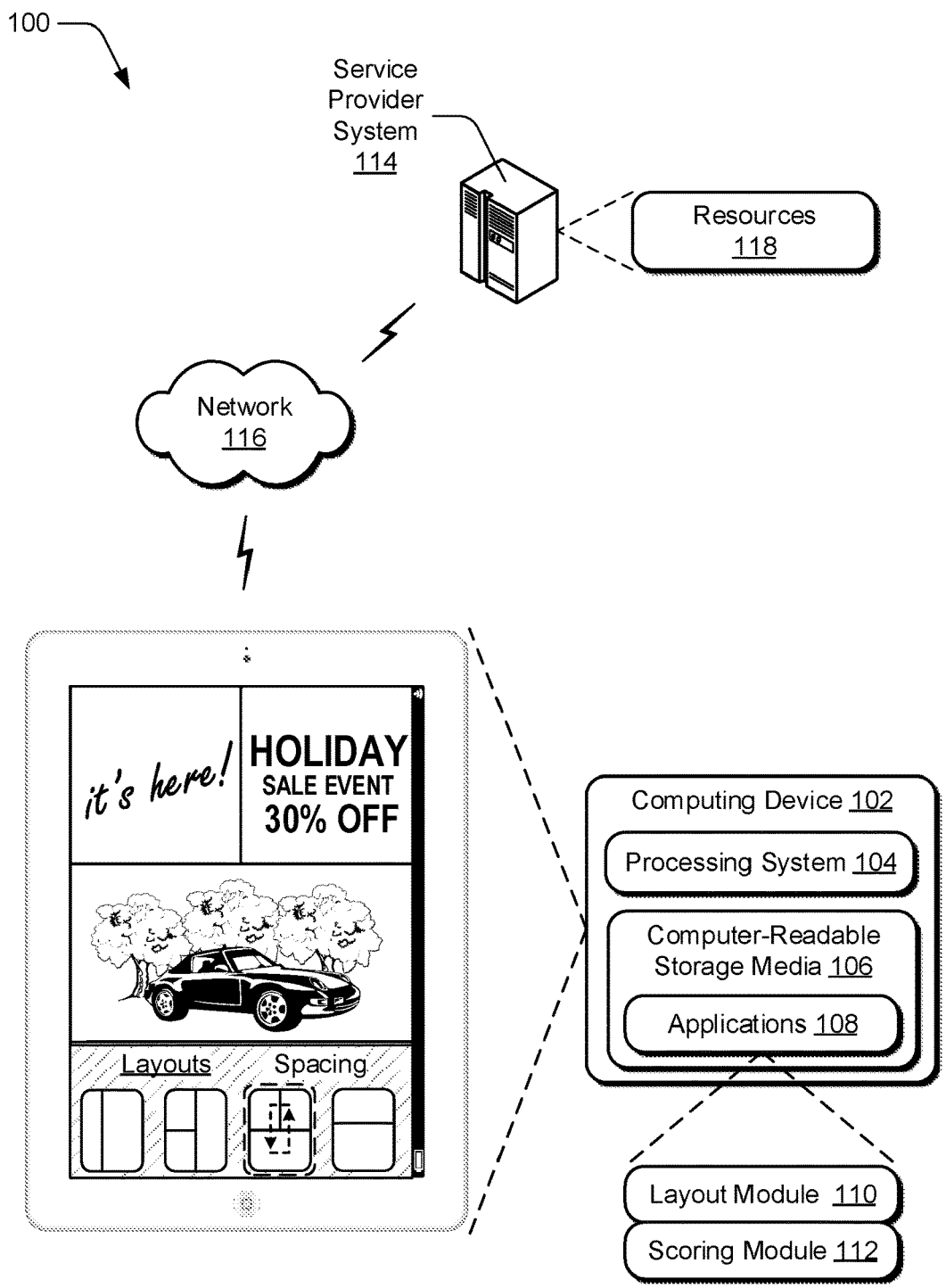
FIG. 1 is an illustration of an environment in an example implementation that is operable to employ responsive grid layouts for graphic design techniques described herein.

Conventional techniques that enable users to create graphic designs generally provide little algorithmic assistance to the users, particularly for exploring variations of layouts for a graphic design. Thus, creating simple graphic designs can be challenging for novice designers who lack experience or talent in graphic design.

Accordingly, techniques for responsive grid layouts for graphic design are described to provide a user with an ability to explore the space of possible designs using layouts formed from a grid (referred to herein as "grid layouts"). The techniques described herein generate new layout suggestions using existing content, which allows the user to cycle through and explore a variety of different layout variations rather than simply building a new layout from a single layout. Each new layout suggestion is formed from grid cells that each include a portion of the content. The techniques described herein also enable automatic resizing of a grid layout, and adaptively select appropriate grid layouts for recommendation to the user based on various aesthetic criteria, such as aspect ratio, of the design.

The grid allows freeform placement of text or images, which the system processes automatically. The grid also allows the user to reposition, resize, or rotate the text. Then, when the user resizes the overall layout or resizes one or more cells in the layout, the system automatically adjusts the content within the cells to maintain an aesthetic quality of the design.

In this way, novice designers can be provided automatic assistance via the application in creating graphic designs, thus enhancing the user experience and enabling the novice designers to more easily create professional-level designs.

Further discussion of these and other examples is included in the following sections and shown in corresponding figures.

Term Examples

"Design element" describes a portion of content in a graphic design such as text, an image, or a video. The design element represents. Each design element can be mapped to a particular cell of the grid layout, and positioned and sized to fit aesthetically within that cell. In at least one example, a group of design elements can be grouped as one unit that can be preserved as it is moved to different locations in the graphic design.

"Grid layout" describes a layout formed by a plurality of cells that form a grid. A cell in the grid (also referred to herein as "grid cells") can be mapped to various design elements, or various design elements can be mapped to the cell. Grid layouts can include a variety of different numbers of cells, aspect ratios of the cells, aspect ratios of the grid layouts, cell arrangements (relative positions), sizes of spacing between the cells, sizes of margins, relative layouts of a subset of elements within a cell, overlap (foreground/background positioning of cells), and so on. Accordingly, a wide variety of different grid layouts can be created to represent different graphic designs.

"Aesthetic criteria" describes rules that can be applied to the content of the grid layout. In implementations, the aesthetic criteria represents thresholds pertaining to different visual characteristics of a design element(s) within a cell, or of an overall grid layout. Examples of aesthetic criteria include symmetry, cell aspect ratios, text density in a cell, and so on. For instance, the design element(s) within a cell can be analyzed for symmetry within the cell or in relation to design elements in other cells of the grid layout, and appropriately positioned within the cell. Additionally, the cell aspect ratio is used to determine whether the design element in the cell is too large or too small to be visually pleasing to consumers. Further, the text density with a cell is analyzed to determine whether the cell includes too much text. Accordingly, aesthetic criteria describes a variety of different visual characteristics of the content in the grid layout with respect to each cell.

"Parameters" refer to characteristics of a design element, such as text or an image. Examples of parameters include size, alignment, position, orientation, and so on. Accordingly, parameters describe a variety of different characteristics of the design element.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures. Finally, an example system and device is described that may implement the various techniques described herein.

Example Environment

FIG. 1 depicts an example digital medium environment 100 configured to support responsive grid layouts for graphic design. As used herein, the term "digital medium environment" refers to the various computing devices and resources that can be utilized to implement the techniques described herein. The illustrated digital medium environment 100 includes a computing device 102 including a processing system 104 that includes one or more processing devices, one or more computer-readable storage media 106, and various applications 108 embodied on the computer-readable storage media 106 and operable via the processing system 104 to implement corresponding functionality described herein.

In at least some implementations, the applications 108 include or otherwise make use of a layout module 110 and a scoring module 112. In some implementations, the layout module 110 and the scoring module 112 are standalone applications. In other implementations, one or both of the layout module 110 and the scoring module 112 are included as part of another application or system software such as a computing device's operating system.

The layout module 110 is configured to generate a plurality of grid layout suggestions for a graphic design that a user may explore. Given a set of design elements (e.g., text, images), for example, the layout module 110 can provide a variety of different grid structures with different configurations of the design elements.

The scoring module 112 is configured to assign scores to the grid layout suggestions based on various aesthetic criteria pertaining to the design elements in respective cells of the layouts. Using these scores, the "best" permutations can be presented as recommended layouts for the content.

This constitutes an improvement over conventional approaches that do not provide much assistance to users in creating layouts for graphic designs. This also constitutes a further improvement over conventional approaches that simply build from a single layout and do not allow the user to explore variations of layouts. In addition, the grid structure allows for more complex graphic designs in comparison to conventional approaches that use free-floating elements and lack overall structure to their layout design.

The layout module 110 is further configured to automatically and dynamically adjust content in a displayed layout responsive to a user input, such as by positioning or resizing an element or cell. This can be performed in real time as the user is manipulating the element or cell, which provides immediate visual feedback to the user to allow the user to see the layout responding to their input. Accordingly, the system described herein can make decisions as the user is manipulating the element or cell.

This combination of manual and automatic layout control constitutes an additional improvement over conventional approaches that provide control to the user but without automatic assistance. This combination of manual and automatic layout control provides a fast, efficient, and easily scalable solution, as discussed below in more detail.

The computing device 102 may be configured in a variety of ways. For example, the computing device 102 may be configured as a desktop computer, a laptop computer, a television, a mobile device (e.g., assuming a handheld configuration such as a tablet or mobile phone), a tablet, a digital camera, and so forth. Additionally, although a single computing device 102 is shown, the computing device 102 may be representative of a plurality of different devices to perform operations "over the cloud" as further described in relation to FIG. 12.

Although functionality of the layout module 110 and the scoring module 112 is illustrated as implemented locally on the computing device 102, the functionality of the layout module 110 and the scoring module 112 may also be implemented in whole or in part via a service provider system 114 via a network 116. The service provider system 114 is configured to communicate with the computing device 102 over the network 116, such as the Internet, to provide a "cloud-based" computing environment. Generally speaking, the service provider system 114 is configured to make various resources 118 available over the network 116 to a user of the computing device 102. The resources 118 can include any suitable combination of services and/or content typically made available over a network by one or more providers. Some examples of services include, but are not limited to, a social networking service, a graphic design service, an image sharing service, and so forth.

Although the network 116 is illustrated as the Internet, the network may assume a wide variety of configurations. For example, the network 116 may include a wide area network (WAN), a local area network (LAN), a wireless network, a public telephone network, an intranet, and so on. Further, although a single network 116 is shown, the network 116 may be representative of multiple networks.

Example Implementations

Figure 2:
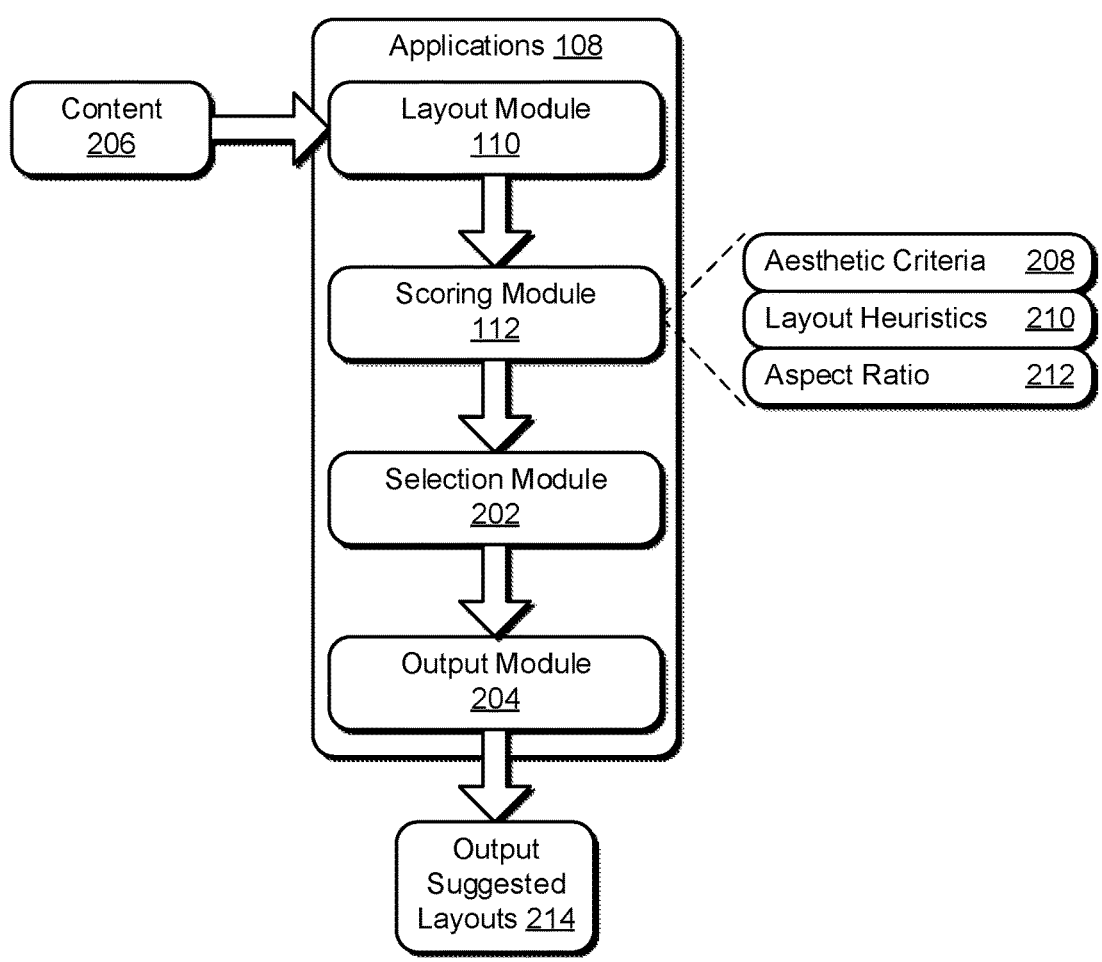
FIG. 2 is an illustration of a digital medium environment in an example implementation showing applications of FIG. 1 in greater detail as configured for generating responsive grid layouts for graphic design.

FIG. 2 illustrates an example implementation 200 of operation of various modules of the computing device 102 in greater detail. The applications 108 are illustrated as including the layout module 110, the scoring module 112, a selection module 202, and an output module 204. These modules can be implemented in hardware, software, firmware, or a combination thereof.

The layout module 110 is implemented at least partially in hardware of a computing device to generate a variety of different grid layouts for existing content 206. Each grid layout includes at least one cell configured to be mapped to at least one design element of digital content. The scoring module 112 assigns scores to the grid layouts based on a variety of criteria, such as aesthetic criteria 208, layout heuristics 210, and aspect ratio 212.

The aesthetic criteria 208 refers to rules applied to the content in relation to the grid layout to avoid a low quality layout of content, such as a layout that is not visually pleasing to the user. For example, cells that are too narrow or too thin are penalized with a low score so they may be avoided. When creating a new layout, the system tends toward cells having an aspect ratio of approximately 1:1, 1:2, 2:1, and so on, which generally provide sufficient space for the layout of content within the cell. In implementations, the aesthetic criteria 208 is used to determine whether the content within a cell includes good symmetry, whether the content is too dense within the cell, whether spacing between the content in the cell and boundaries of the cell is an appropriate size, whether the content is sized appropriately in relation to the size of the cell, and so on.

Layout heuristics 210 are used to place design elements into a grid cell. The layout heuristics 210 can be used to group different design elements together within a cell. For instance, if two or more design elements (e.g., text) are aligned, either within a cell or across different cells of the grid layout, then that alignment can be used to indicate whether to group those elements. Additionally, if two or more design elements are proximate one another, then that proximity can be used determine whether to group those elements. Then, if the grid layout is modified or changed, the group of elements can be automatically maintained in the new grid layout. In one example, if different text elements are aligned but located in different cells, then when the grid layout is changed to a new grid layout, the entire group of text elements can be positioned within the same cell in the new grid layout. Additionally or in the alternative, the layout heuristics 210 can also be used to split a group of design elements into multiple groups that can be positioned within a same cell or spread across multiple cells.

Aspect ratio 212 refers to an aspect ratio of an individual cell or an aspect ratio of the overall grid layout. The aspect ratio 212 is used to determine positioning of content within a cell or within the grid layout. In implementations, the aspect ratio 212 is used to determine whether content in a cell is appropriately sized and/or positioned. For example, if a large image of a face is placed within a cell and the aspect ratio 212 of that cell is such that the face is only partially visible, then the image can be resized or cropped based on the aspect ratio 212 of that cell. If the image cannot be resized or cropped to an appropriate size, then this particular permutation may be scored with a low score.

The selection module 202 is implemented at least partially in hardware of a computing device to select grid layouts from those generated by the layout module 110. In implementations, the selection module 202 can select particular grid layouts based on the assigned score of the grid layouts. In this way, low scoring grid layouts may not be shown to the user and may be discarded. On the other hand, high-scoring grid layouts are selected as having the "best" mapping of content to their particular layout based on the applied rules (e.g., aesthetic criteria 208, layout heuristics 210, aspect ratio 212, and so on).

The output module 204 is implemented at least partially in hardware of a computing device to output at least one grid layout for recommendation to the user based on the scores. In implementations, the output module 204 is configured to output the grid layouts selected by the selection module 202, which are the highest-scoring grid layouts having a relatively highest level of visual quality based on the applied rules. These grid layouts are output as recommended layout designs for the user to explore.

Figure 3:
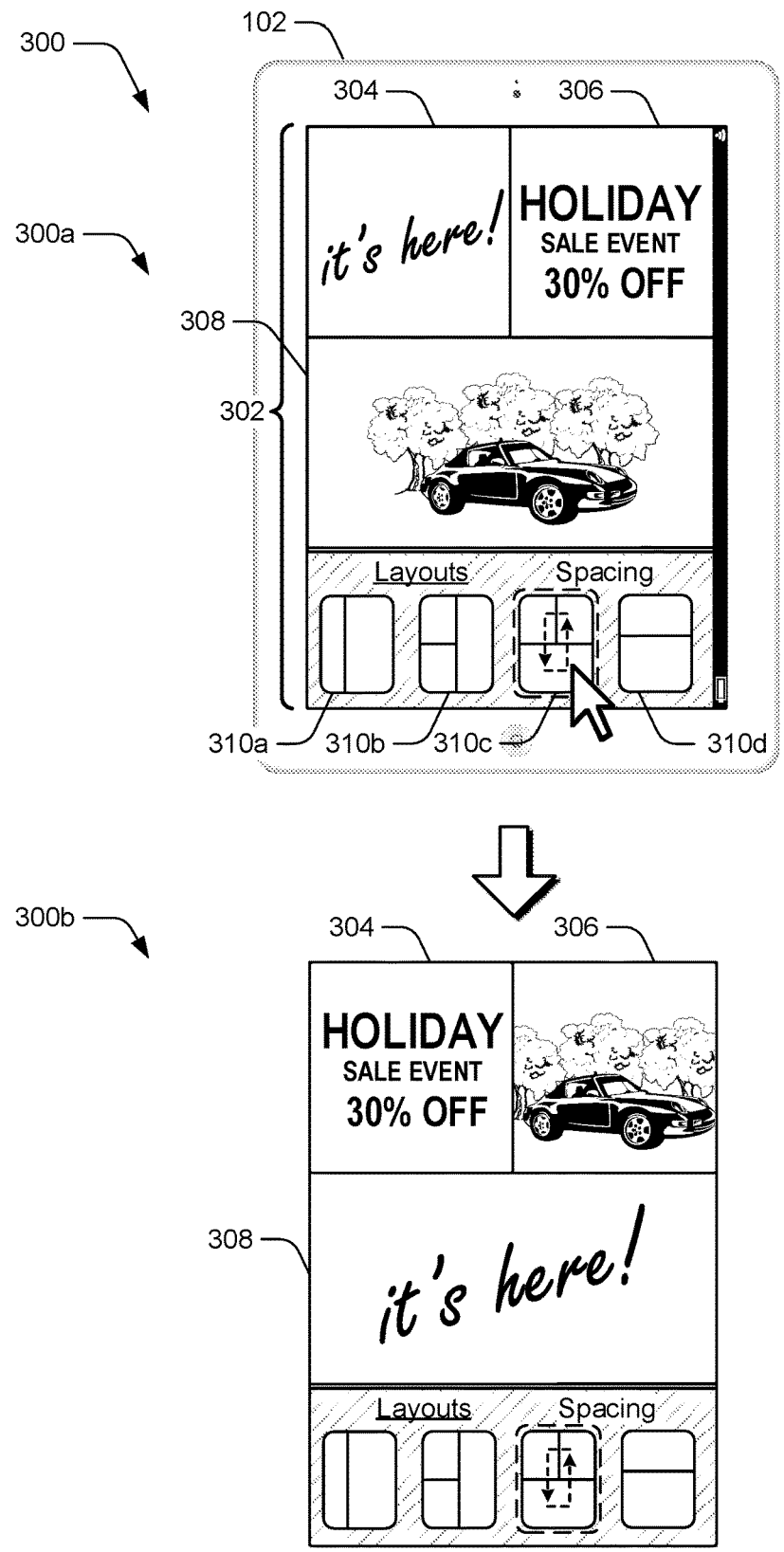
FIG. 3 illustrates an example implementation of a user interface output by the computing device in which content can be switched to different cells in a grid layout.

FIG. 3 illustrates an example implementation 300 of a user interface output by the computing device 102 in which content can be switched to different cells in a grid layout. In the illustrated example, the computing device 102 includes a user interface 302 via which a graphic design is presented having a grid layout with multiple cells, such as cells 304, 306, 308. For example, cell 304 includes "it's here!" text, cell 306 includes "HOLIDAY SALE EVENT 30% OFF" text, and cell 308 includes in image of a car. In addition, the user interface 302 includes several grid layout designs represented by selectable user interface instrumentalities, such as icons 310a-d.

In an example, icon 310c represents a similar grid structure to the displayed grid layout, but includes arrows indicating a change of cell position or content position relative to cell position. When the user selects icon 310c, the content in each cell is relocated to an adjacent cell. For example, the "it's here!" text in cell 304 in scenario 300a is relocated to cell 308 in scenario 300b, the text elements in cell 306 in scenario 300a are relocated to cell 304 in scenario 300b, and the image in cell 308 in scenario 300a is relocated to cell 306 in scenario 300b. Accordingly, the cell contents are moved to a neighboring cell in a counterclockwise direction. Alternatively, the contents can be moved to adjacent cells in a clockwise direction. This allows the user to quickly and easily view variations of the content in different cells of the grid layout.

Figure 4:
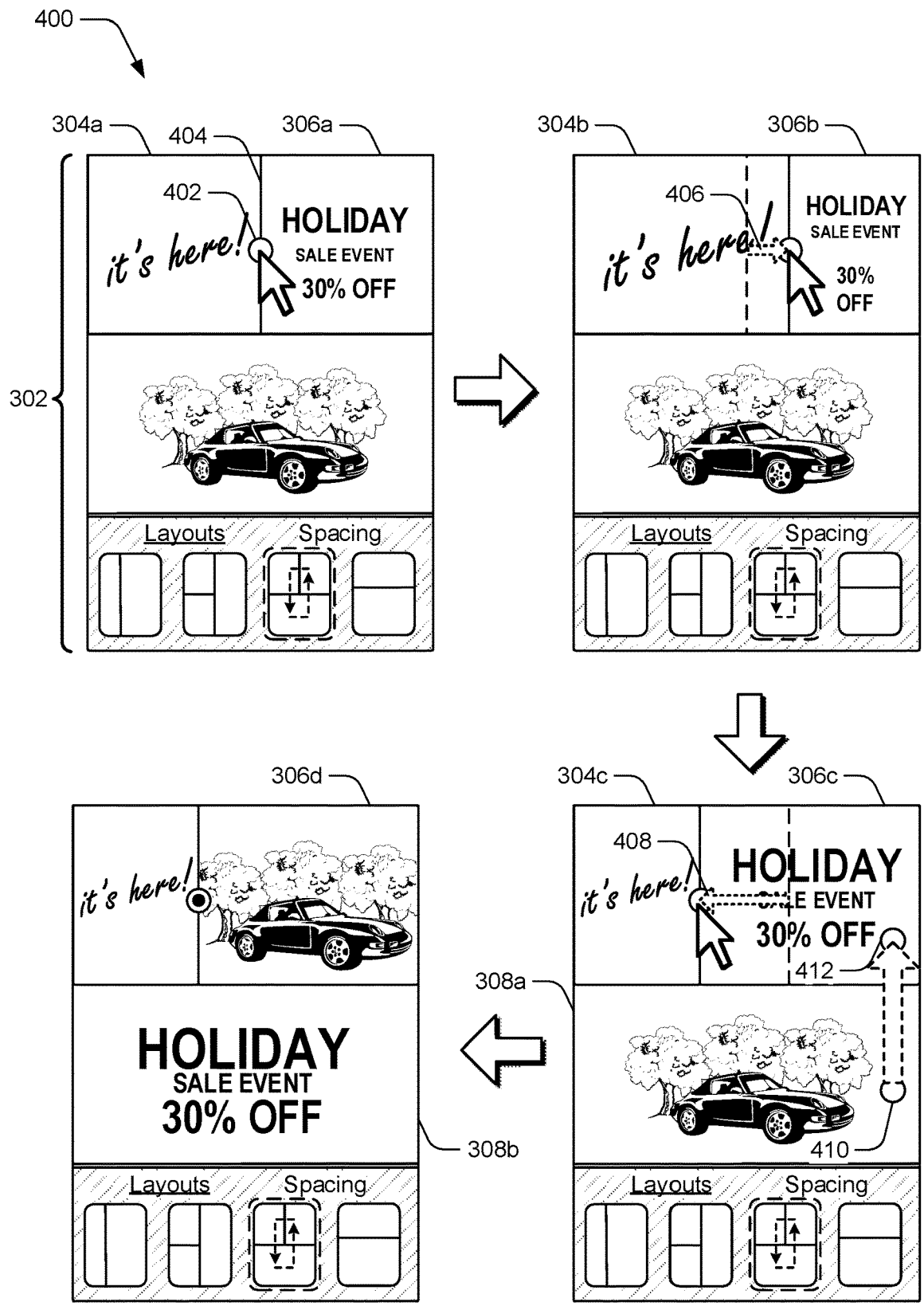
FIG. 4 illustrates an example implementation of a user interface output by the computing device in which cell contents are automatically adjusted based on a cell being resized.

FIG. 4 illustrates an example implementation 400 of a user interface 302 output by the computing device 102 in which cell contents are automatically adjusted based on a cell being resized. In the illustrated example, the user interface 302 includes a grid layout that was generated using design elements selected or inserted by a user. Using the structure of the grid layout, a control point 402 is selected based on a user input, where the control point 402 corresponds to a cell boundary 404 positioned between cell 304*a* and cell 306*a*. The user can then move the cell boundary 404 in a direction orthogonal to the cell boundary 404 itself, such that the cells 304, 306 on either side of the cell boundary 404 are resized (e.g., increased or decreased in size). In the illustrated example, the user slides the cell boundary 404 to the right (indicated by arrow 406), which enlarges cell 304*a* and shrinks cell 306*a*, resulting in an enlarged cell 304*b* and a shrunken cell 306*b*.

Based on the change in size of both cells, the content within each cell is analyzed according to the aesthetic criteria 208, the layout heuristics 210, and the aspect ratio 212 to determine whether the content is appropriately sized and positioned within the cell. In this example, enlarging the cell 304*a* creates additional space around the text located within the enlarged cell 304*a*. As such, the text within the cell 306*a* is enlarged and recentered within the enlarged cell 304*b*. In addition, the size of the cell 306*a* is decreased, which creates less space for the text located within the shrunken cell 306*b*. Accordingly, the text within the shrunken cell 306*b* is resized to a smaller font. The cell resizing and the text modifying are all done in real time as the user is manipulating the cell boundary 404. In this way, the user is provided immediate visual feedback regarding the changes being made to the grid layout. In some embodiments, manipulating the cell boundary 404 can include manipulating the space within the cell boundary 404 to cause a cell and its surrounding cells to be resized and the text within the cell and the text within the surrounding cells to be modified in real time in response to the manipulation.

The user can then, with or without interrupting the input (e.g., with or without releasing a mouse click or removing his finger from a touch surface of the computing device 102), move the cell boundary 404 farther in the same direction or in an opposing direction (e.g., left), as indicated by arrow 408. As the cell boundary 404 is moved, the cell 304*b* is adjusted to a smaller size while the cell 306*b* is enlarged, resulting in cell 304*c* and cell 306*c*. Again, the content within each cell 304*c*, 306*c* is scaled to appropriately fit within the cell. Any interior cell boundary (e.g., cell boundary between two or more cells) can be moved by the user to resize corresponding cells. This gives the user a great deal of control while simultaneously providing automatic assistance to the user by dynamically modifying cell contents in real time to appropriate positions and sizes based on the visual characteristics of the content in each cell.

In addition, the user can, at any time, move the contents from one cell to another cell. In at least some implementations, moving the contents from one cell to another cell that already includes content can cause the contents of those two cells to automatically switch places. If those two cells differ in size or aspect ratio, the content is automatically adjusted to "fit" within the new size or aspect ratio. In an example, the user performs a drag gesture, such as by sliding his finger from location 410 to location 412 or by clicking the location 410 and dragging the cursor to location 412. This input indicates that the user wishes to move the image of the car from cell 308*a* to cell 306*c*. In response to this input, the system automatically switches the contents (e.g., text and image) of those two cells, makes appropriate modifications to the contents, and displays the contents in their new positions, as shown in cell 306*d* and cell 308*b*.

Figure 5:
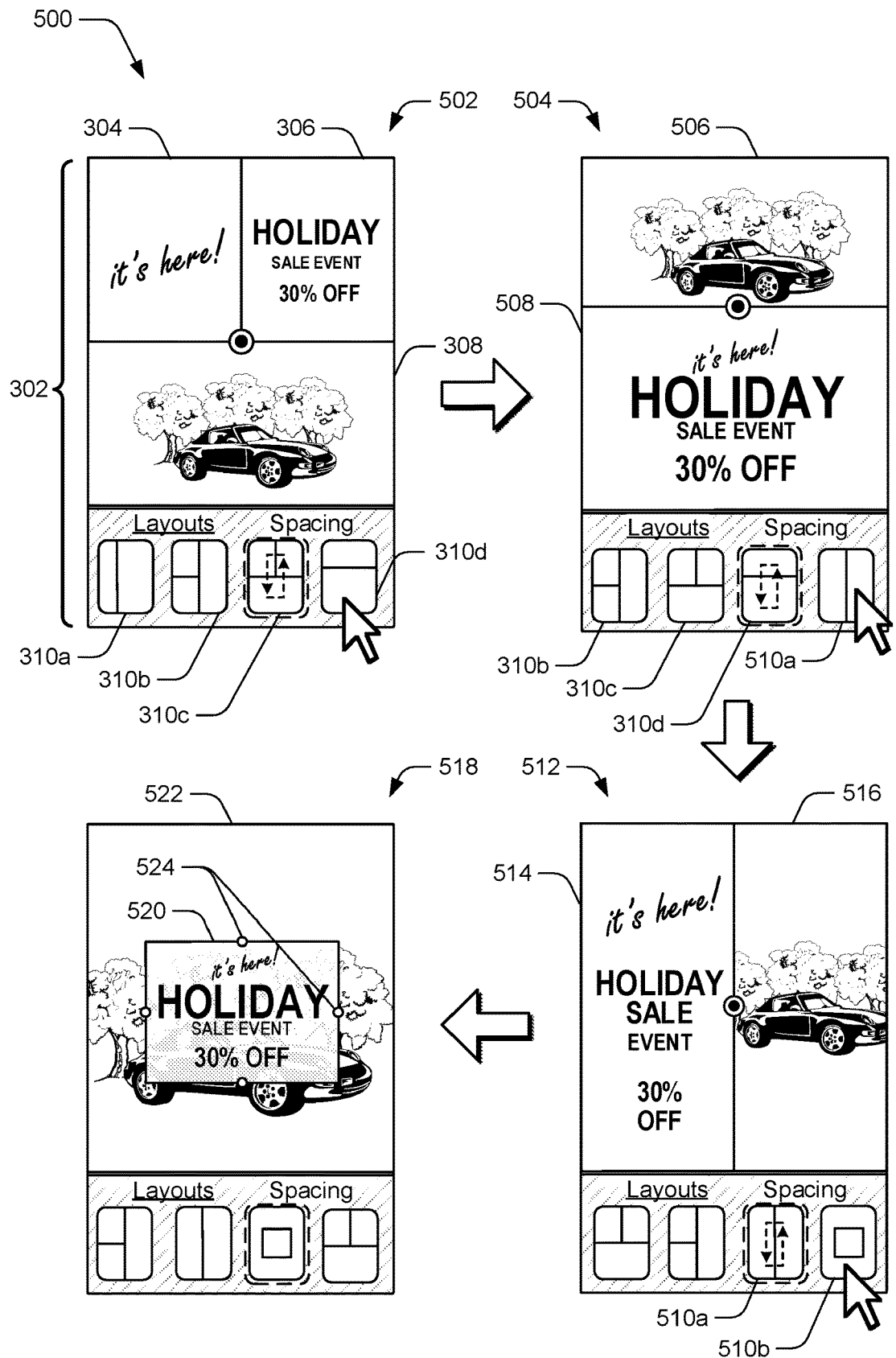
FIG. 5 illustrates an example implementation of a user interface output by the computing device in which different grid layout suggestions are selected.

FIG. 5 illustrates an example implementation 500 of a user interface 302 output by the computing device 102 in which a different grid layout suggestions are selected. As described above, a variety of grid layout suggestions are generated for the user to explore using the given content. While exploring these grid layout suggestions, the content is automatically positioned and sized in respective cells of each selected layout to give the user a fast and efficient view of what the user's graphic design will look like in each selected layout.

In the illustrated example, various grid layout suggestions are displayed via the user interface 302, which are represented by icons such as icons 310*a-d*. Here, the current grid layout 502 displayed in the user interface 302 corresponds to icon 310*c*, which represents a grid layout having two cells distributed in an upper portion of the grid and one cell disposed on the lower portion. The icons 310*a-d* are selectable to change the layout of the displayed content in the user interface 302.

For example, the user selects icon 310*d* representing a grid layout having two cells adjacent one another top to bottom. When the user selects the icon 310*d*, the content displayed in the user interface 302 is adjusted to correspond to a new grid layout 504. For example, the new grid layout 504 includes cell 506 and cell 508. Because the content in the grid layout 502 was distributed among three cells but the new grid layout only includes two cells, some of the content can be grouped together as a unit to be displayed in a single cell. Here, the system determines that the text that was formerly located within cell 304 and cell 306 can be grouped together to be positioned within the cell 508 in the new grid layout 504. The grouping is based on the layout heuristics 210, such as alignment or proximity, as described above. Given a group of text elements that are to be placed in a new cell and which have a micro-layout (e.g., a relative layout of a subset of elements) relative to one another, the system can use complex text layout heuristics to try to match the existing text elements' original size, alignment, and spacing while positioning the group in the new cell. However, while the system tries to match the original formatting of the text elements, the text elements may be modified based on the aspect ratio of the new cell. For example, the text from the cell 304 and cell 306 is resized to fit aesthetically within the cell 508 to provide a more visually pleasing graphic design.

In an example, when the user selects a new grid layout, the icons 310*a-d* can be shifted to reveal additional grid layout suggestions. Additionally, the user can scroll through the icons to reveal additional icons representing even more grid layout suggestions. Here, the user selects icon 510*a*, which represents a grid layout having two cells positioned side-by-side (left to right), and the grid layout 504 is changed to grid layout 512. The contents (e.g., text) of cell 508 are repositioned and mapped to cell 514, and the contents (e.g., image) of cell 506 are mapped to cell 516. Notice that in mapping the text to cell 514, several changes are made to resize, realign, and reposition the text within the cell 514. In implementations, each line of text can be considered an individual design element. Alternatively, each word of text can be considered an individual design element. Each design element is automatically adjusted based on the size or aspect ratio of the cell in which the design element is placed. Here, the "it's here!" text is enlarged and the size of the "HOLIDAY" text is reduced. In addition, the "SALE EVENT" text is divided into "SALE", which is enlarged, and "EVENT" which maintains a substantially same size. Further, the "30% OFF" text is divided into two separate elements "30%" and "OFF", and both elements are reduced in size and aligned one above the other.

As before, at least one additional icon, such as icon 510*b*, can be presented when displaying the selected grid layout. The user can select icon 510*b* to cause the grid layout 512 to switch to grid layout 518, which includes a foreground cell 520 overlaid in front of a background cell 522. In this grid layout, the foreground cell 520 can not only be resized, e.g., by moving control points 524, but the foreground cell 520 can also be moved to a different position relative to the background cell 522 layered underneath. In addition, the foreground cell 520 can be made semitransparent to cause the contents of the background cell 522 underneath to be partially visible through the foreground cell 520. In addition, changing the grid layout 512 to the grid layout 518 dynamically updates the contents of the cells based on the above-described rules.

In at least some implementations, a user-selectable option can be provided to disable automatic resizing, reformatting, and/or repositioning of one or more design elements when switching between different grid layouts. In one example, one or more text elements are selected, automatically or via user input, and image elements can be resized and repositioned based on a new selected grid layout, but the one or more text elements remain in place with no changes. In some cases, this may cause a particular text element to overlap multiple grid cells. Any design element can be selected and the automatic resizing, reformatting, and/or repositioning of the selected design element disabled for that selected design element to allow more versatility to the grid layout suggestions.

Figure 6:
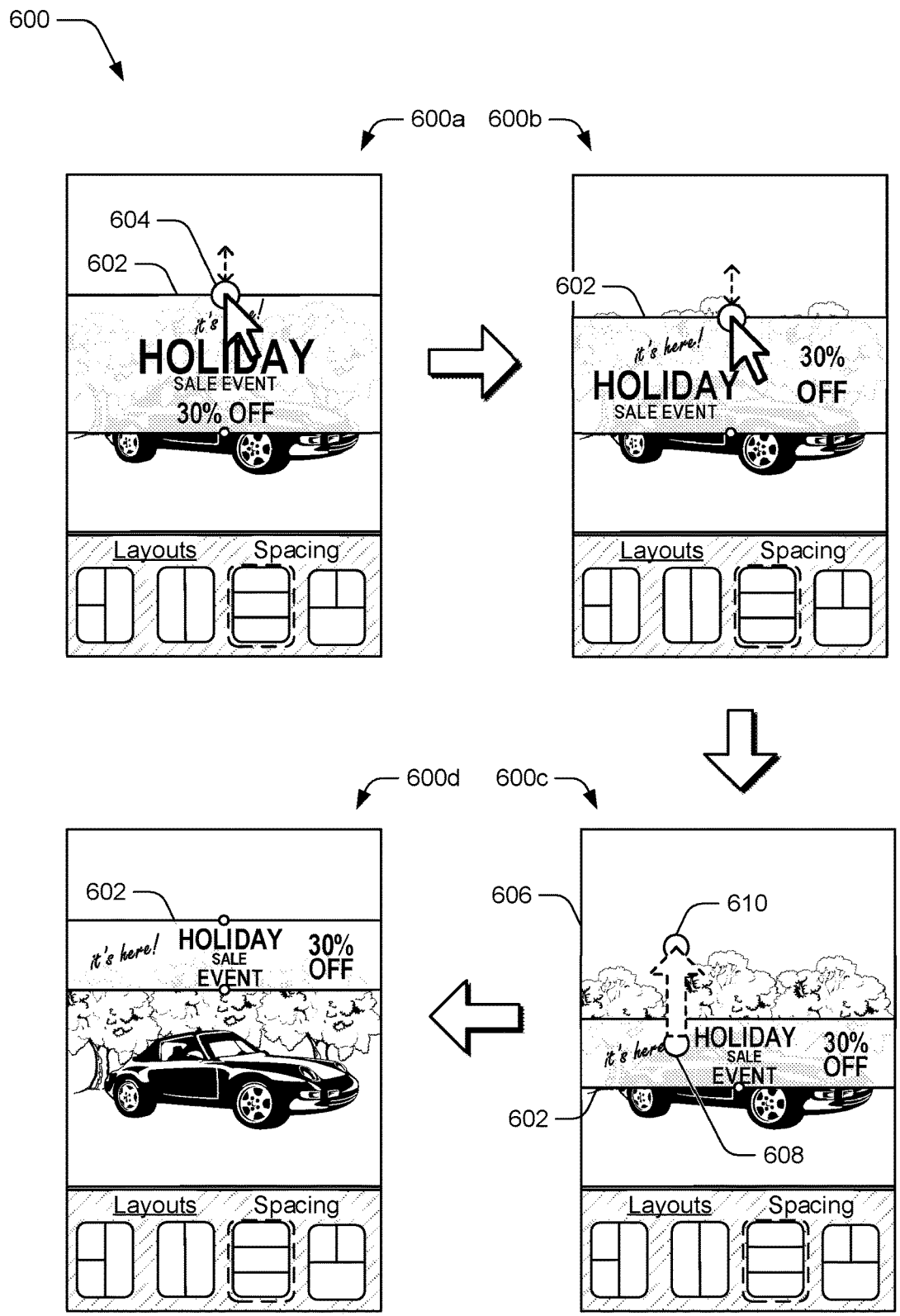
FIG. 6 illustrates an example implementation of a user interface output by the computing device in which a layout of elements within a cell are adjusted automatically based on the cell being resized.

FIG. 6 illustrates an example implementation 600 of a user interface output by the computing device 102 in which a layout of elements within a cell are adjusted automatically based on the cell being resized. In scenario 600*a*, the user can adjust the aspect ratio of cell 602 by moving control point 604. For example, as the user moves the control point 604 down to decrease a height of the cell 602, the height of the text in the cell 602 may no longer be shorter than the height of the cell 602. Thus, the text may be automatically modified to correspond to the new height of the cell 602. For instance, in scenario 600*b*, the text within cell 602 is divided into two groups that are positioned horizontally side by side within the cell 602. If the user reduces the height of the cell 602 further, as in scenario 600*c*, the text is automatically adjusted by dividing the text into three groups that are distributed horizontally across the cell 602. The font size of some of the text is also reduced to reduce the height and/or width of the text. As described above, the user can move the cell 602 to a different location relative to a cell 606 underneath, such as by selecting the cell 602 and dragging the cell 602 from input location 608 to input location 610.

Figure 7:
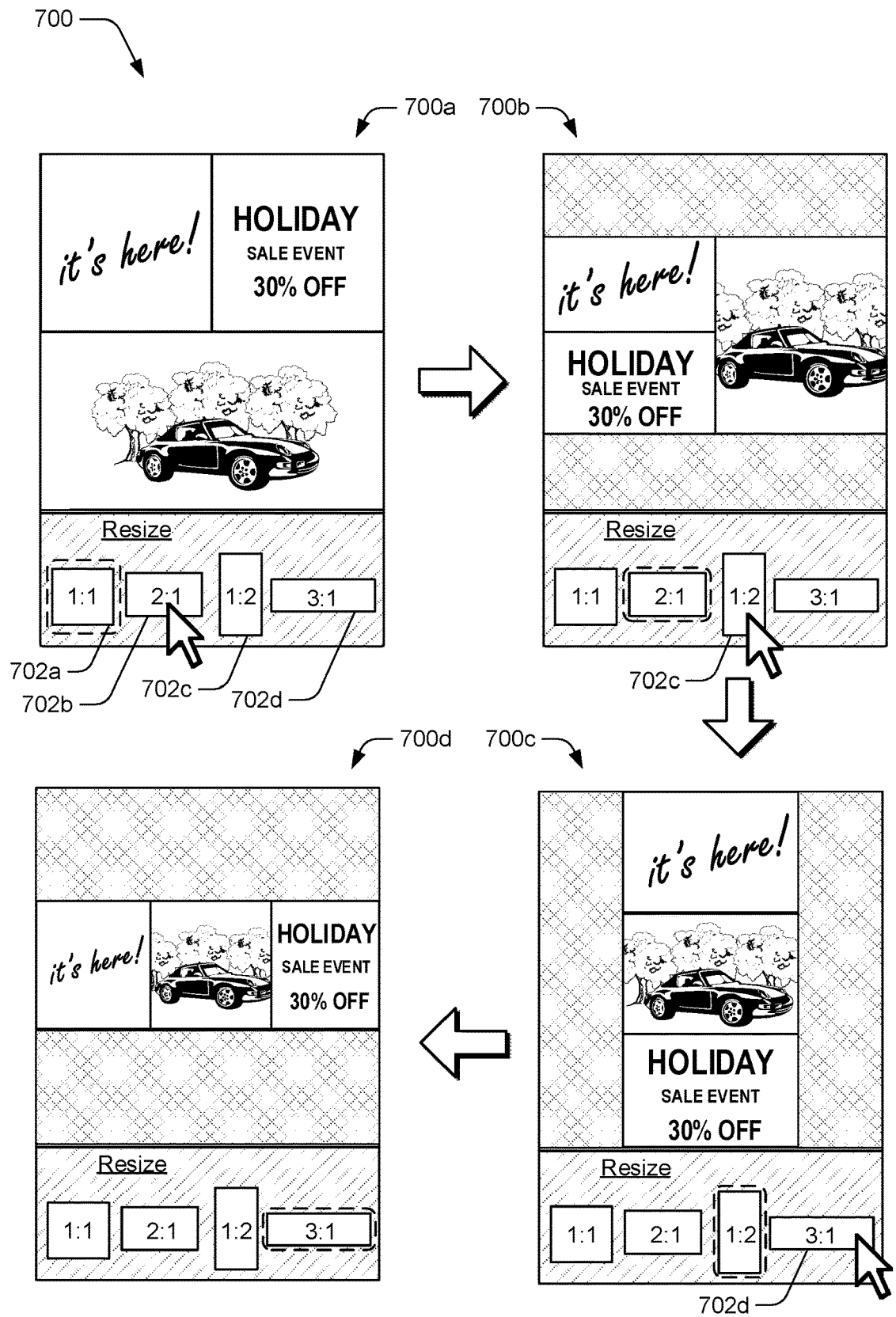
FIG. 7 illustrates an example implementation of a user interface output by the computing device in which an overall grid layout is resized.

FIG. 7 illustrates an example implementation 700 of a user interface output by the computing device 102 in which an overall grid layout is resized. For example, a grid layout 700*a* corresponding to an aspect ratio of 1:1 is displayed. In implementations, various different aspect ratios can be represented by selectable user interface instrumentalities, such as icons 702*a-d*, that are displayed via the user interface. Selecting one of the icons can change the aspect ratio of the graphic design, and in some cases, change the grid layout to conform to the new aspect ratio based on the aesthetic criteria.

For example, the user selects aspect ratio 2:1 by selecting icon 702*b* and the graphic design is automatically resized to the selected aspect ratio. Because of the change in the aspect ratio, the grid layout 700*a* is changed to a new grid layout 700*b* that more appropriately corresponds to the height of selected aspect ratio. Contents of the cells in the original grid layout 700*a* are moved to new cells in the grid layout 700*b* based on the above-described rules. When the user selects icon 702*c*, the grid layout 700*b* changes grid layout 700*c* having a corresponding aspect ratio of 1:2, and again adjusts one or more parameters of the design elements in the cells to a recommended state in each cell. This particular grid layout 700*c* has positioned the cells vertically since the width of the grid layout 700*c* is small in comparison to the height. The user can select icon 702*d*, which corresponds to an aspect ratio of 3:1, and the grid layout 700*c* changes to grid layout 700*d* and dynamically updates the design elements in each cell of the grid layout 700*d*.

The user can view additional aspect ratios by sliding the icons 702*a-d* in any direction to reveal additional icons. In this way, the user can explore a wide variety of sizes of graphic designs that are each presented with automatic adjustments to the existing design elements.

Figure 8:
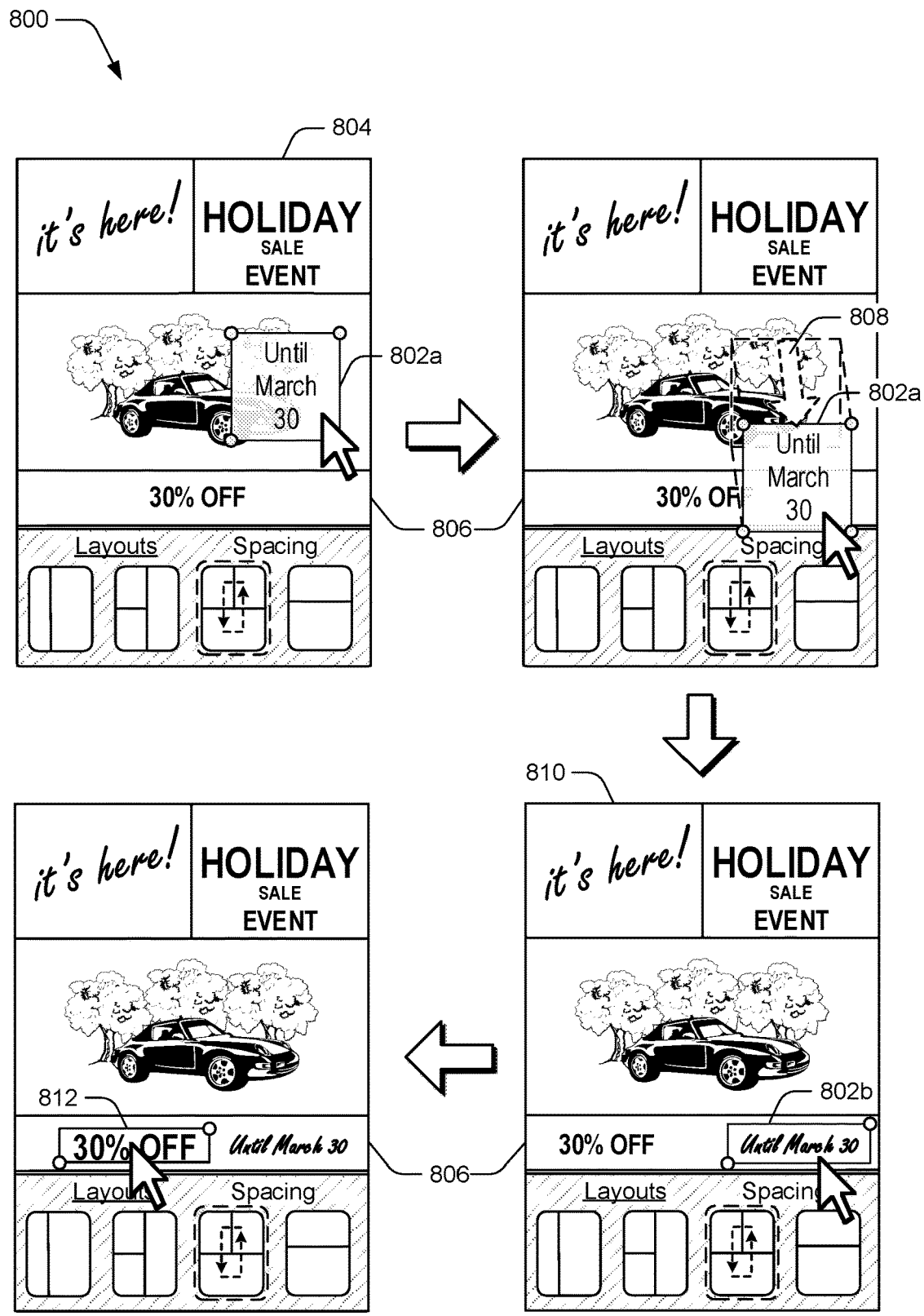
FIG. 8 illustrates an example implementation of a user interface output by the computing device in which a new design element is automatically formatted based on existing content.

FIG. 8 illustrates an example implementation 800 of a user interface output by the computing device 102 in which a new design element is automatically formatted based on existing content. The computing device 102 enables more sophisticated free-form placement of text by the user in comparison to conventional techniques, and the system can handle the text automatically. For example, when a user inserts a new design element, such as text, the new design element can be automatically formatted to substantially match existing content within a cell or within the overall grid layout. Some examples of format adjustments includes font characteristics (e.g., style, size, color, language, transparency, and so on) and positioning (e.g., spacing, alignment with other text in the same cell, alignment with other text in a different cell).

In one example, a user inserts a new text element 802*a* into the grid layout. As the user enters text into the text element 802*a*, the text includes a default font. Alternatively, the font can initially match the font of text in an adjacent cell, such as the "HOLIDAY SALE EVENT" text in the upper right cell, cell 804, or the "30% OFF" text in the bottom cell, cell 806. In implementations, responsive to the text being entered in the text element 802*a*, the system can automatically format the text element 802*a* to substantially match other text in the grid layout. The text can be formatted to match other text within the same cell, or for one or more aesthetic reasons the text can be formatted to match other text in a different cell.

After entering the text in the text element 802*a*, the user then moves the text element 802*a* to a different cell, e.g., the bottom cell 806, as illustrated by arrow 808. In implementations, formatting (e.g., font, color) of the text element is preserved when moving the element. Alternatively, the system can, responsive to the movement, automatically reformat the text element 802*a* as text element 802*b* to substantially match other text in the grid layout. As above, the text can be formatted to match other text within the same cell, or for one or more aesthetic reasons the text can be formatted to match other text in a different cell. Here, the text element 802*b* is modified to substantially match the "it's here!" text located in the upper left cell 810. In addition, the "30% OFF" text that was previously centered within the cell 806 is repositioned to allow for the insertion of the text element 802*b* in accordance with symmetry and alignment rules.

However, the user can make further adjustments to the design elements, such as by moving text element 812 and increasing the font size.

In addition, the text element 802 can be cycled through a plurality of formatting variations based on a user input. This cycling option can allow a user to quickly and easily view the text element 802 in a variety of different suggested formats that may correspond in one or more aesthetic ways to one or more other design elements in the graphic design.

FIG. 9 illustrates an example implementation 900 of a user interface output by the computing device in which spacing and margins of the grid layout are adjusted. In an example, spacing 902 between cells in a grid layout can be adjusted based on a user input that selects a spacing control, such as control 904. The user can move the control 904 in various directions to increase or decrease a size of the spacing 902 between the cells. In at least one implementation, the user can select particular cells to adjust the spacing therebetween, rather than uniformly adjusting the spacing between all the cells of the grid layout. Adjusting the spacing between the cells may decrease or increase the size of adjacent cells. Because of this, the content within the cells is again analyzed based on the rules for aesthetic criteria, spacing, alignment, aspect ratio, and so on, as described above, and corresponding changes are automatically made to the content within those cells.

In addition, margins 906 around the outside edges of the overall grid layout can be adjusted based on a user input that selects a margin control, such as control 908. The user can move the control 904 in various directions to increase or decrease a size of the margins. In at least one implementation, the user can adjust margins individually or in subgroups rather than uniformly adjusting all the margins at once. Similar to spacing adjustments, adjusting the margins may affect the size of some of the cells. Accordingly, the content within the cells is again analyzed based on the above-described rules, and corresponding changes are automatically made to the content within those cells.

Example Procedures

The following discussion describes techniques for automatic capture and refinement of a group image without user intervention that may be implemented utilizing the previously described systems and devices. Generally, any of the components, modules, methods, and operations described herein can be implemented using hardware (e.g., fixed logic circuitry), firmware, software, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 10:
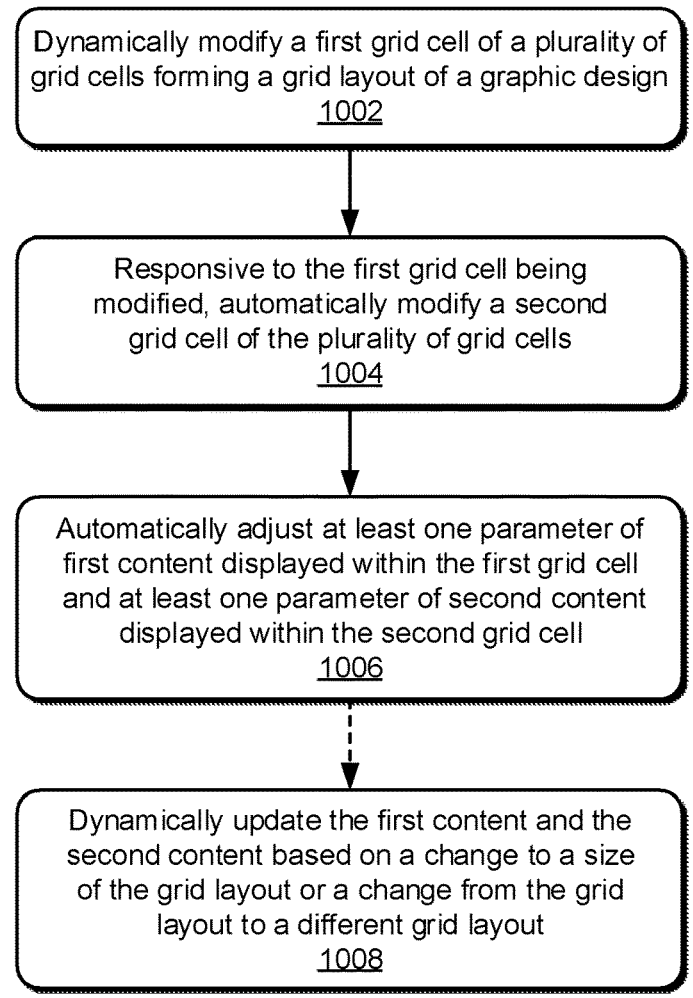
FIG. 10 is a flow diagram depicting a procedure in an example implementation in which responsive grid layouts for graphic design are manipulated.

FIG. 10 is a flow diagram depicting a procedure in an example implementation 1000 in which responsive grid layouts for graphic design are manipulated. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1.

At 1002, a first grid cell of a plurality of grid cells forming a grid layout of a graphic design is dynamically modified based on a user input that manipulates the first grid cell. A variety of modifications can be made to the first grid cell, examples of which are described above, such as with respect to FIGS. 4 and 6.

At 1004, a second grid cell of the plurality of grid cells is automatically modified in response to modifying the first grid cell. In an example, the second grid cell shares a same line as the first grid cell. In some implementations, the second grid cell may be adjacent to the first grid cell. Alternatively, the second grid cell may be separated from the first grid cell by a define distance or by one or more other cells. For example, in a 3×3 grid, a change to a bottom cell can affect a change to a top cell that is in a same or adjacent column or row but that is not adjacent to the bottom cell. In implementations, the modification to the second grid cell triggered by the modification to the first grid cell can include re-sizing or re-shaping the second grid cell. Further, the modification of the second grid cell can include a re-layout of the second grid cell. The re-layout can also include a re-layout of any affected cell, such as the first grid cell and/or one or more additional cells in the grid layout.

At 1006, at least one parameter of first content displayed within the first grid cell and at least one parameter of second content displayed within the second grid cell are automatically adjusted. Any suitable parameter can be adjusted, examples of which include font characteristics and positioning of the content. Additional examples are described above with respect to FIG. 4.

Optionally at 1008, the first content and the second content are dynamically updated based on a change to a size of the grid layout or a change from the grid layout to a different grid layout. Updates to content within a cell can occur to fit the content appropriately to a new size of the cell. Additionally, updates to content within a cell can occur to fit to a new overall grid layout that has a different layout and/or aspect ratio than the previous grid layout. These updates occur in real time as the user is manipulating any of the cell size, the grid layout size, or the grid layout.

Figure 11:
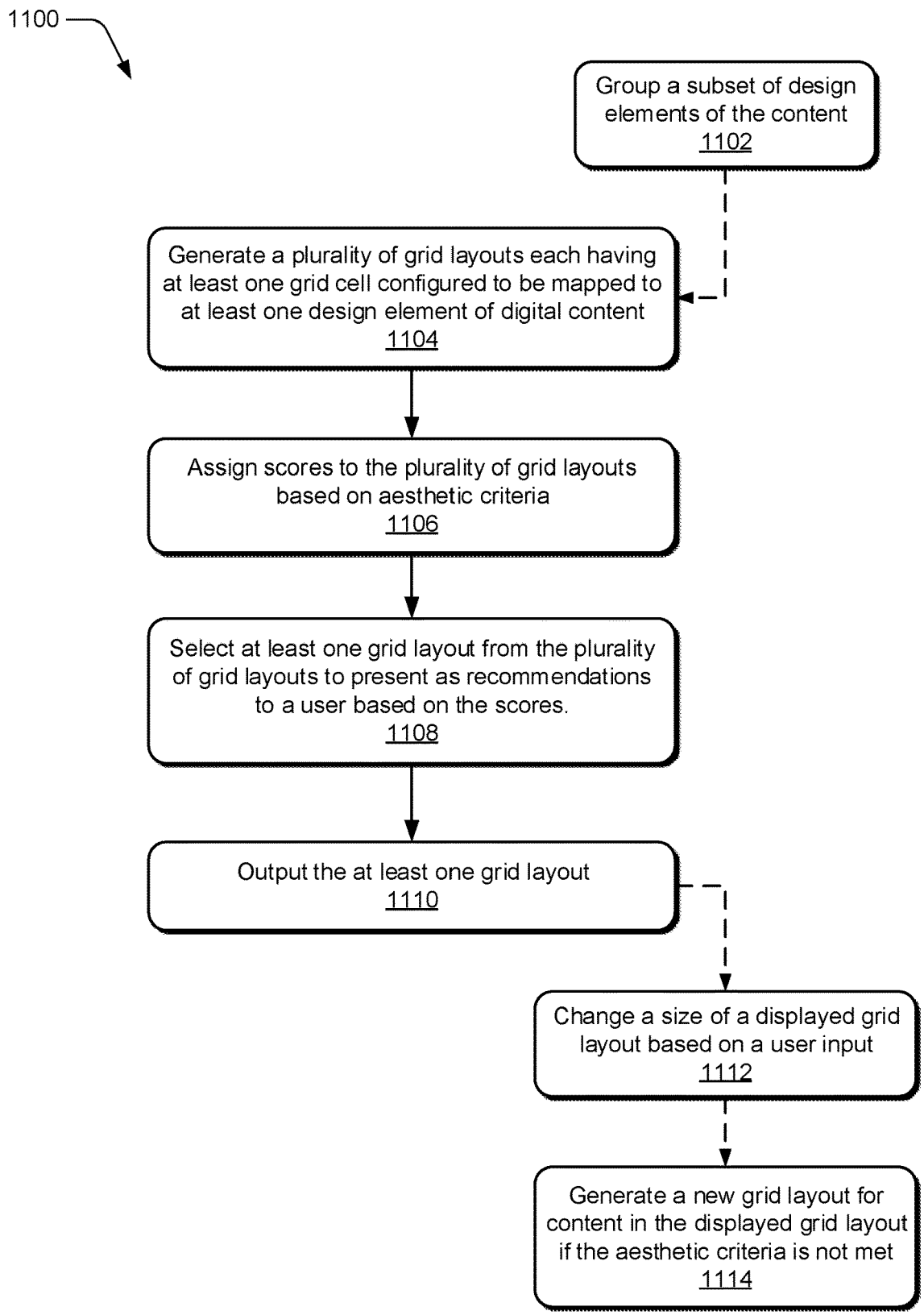
FIG. 11 is a flow diagram depicting a procedure in an example implementation in which responsive grid layouts for graphic design are generated.

FIG. 11 is a flow diagram depicting a procedure 1100 in an example implementation in which responsive grid layouts for graphic design are generated. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1.

Optionally at 1102, a subset of design elements of content in a grid layout is grouped together as a unit. The subset of design elements can be grouped in any suitable way, such as by utilized the layout heuristics 210 described above with respect to FIG. 2.

At 1104, a plurality of grid layouts are generated that each have at least one cell configured to be mapped to at least one design element of digital content. At 1106, scores are assigned to the plurality of grid layouts based on aesthetic criteria. In implementations, each grid layout is scored with a value representing its corresponding degree of aesthetic quality, where the level of aesthetic quality is based on the aesthetic criteria 208 described with respect to FIG. 2.

At 1108, at least one grid layout of the plurality of generated grid layouts is selected for recommendation to a user based on the scores. In at least one example, highest-scoring grid layouts are selected to use as suggested grid layouts for the user to explore.

At 1110, the selected grid layout(s) is presented to the user. For example, selected grid layouts can be presented as selectable options for the graphic design that the user can select to explore various grid layouts using existing content.

Optionally at 1112, a size of a displayed grid layout is changed based on a user input. For instance, the grid size can be modified based on a user input that selects a different aspect ratio. Examples of changing the size of the grid layout are described above, at least with respect to FIG. 7.

Optionally at 1114, a new grid layout is generated for content in the displayed grid layout if the aesthetic criteria is not met. For example, if a grid layout is assigned a low score based on the aesthetic criteria 208, then that particular grid layout can be discarded and a new, different grid layout generated. The aesthetic criteria 208 is used to present particular grid layout suggestions to the user that meet a visual quality threshold. This reduces the number of possibilities presented to the user and reduces a processing load on the processing system 104 of the computing device 102 or on the service provider system 114.

Example System and Device

Figure 12:
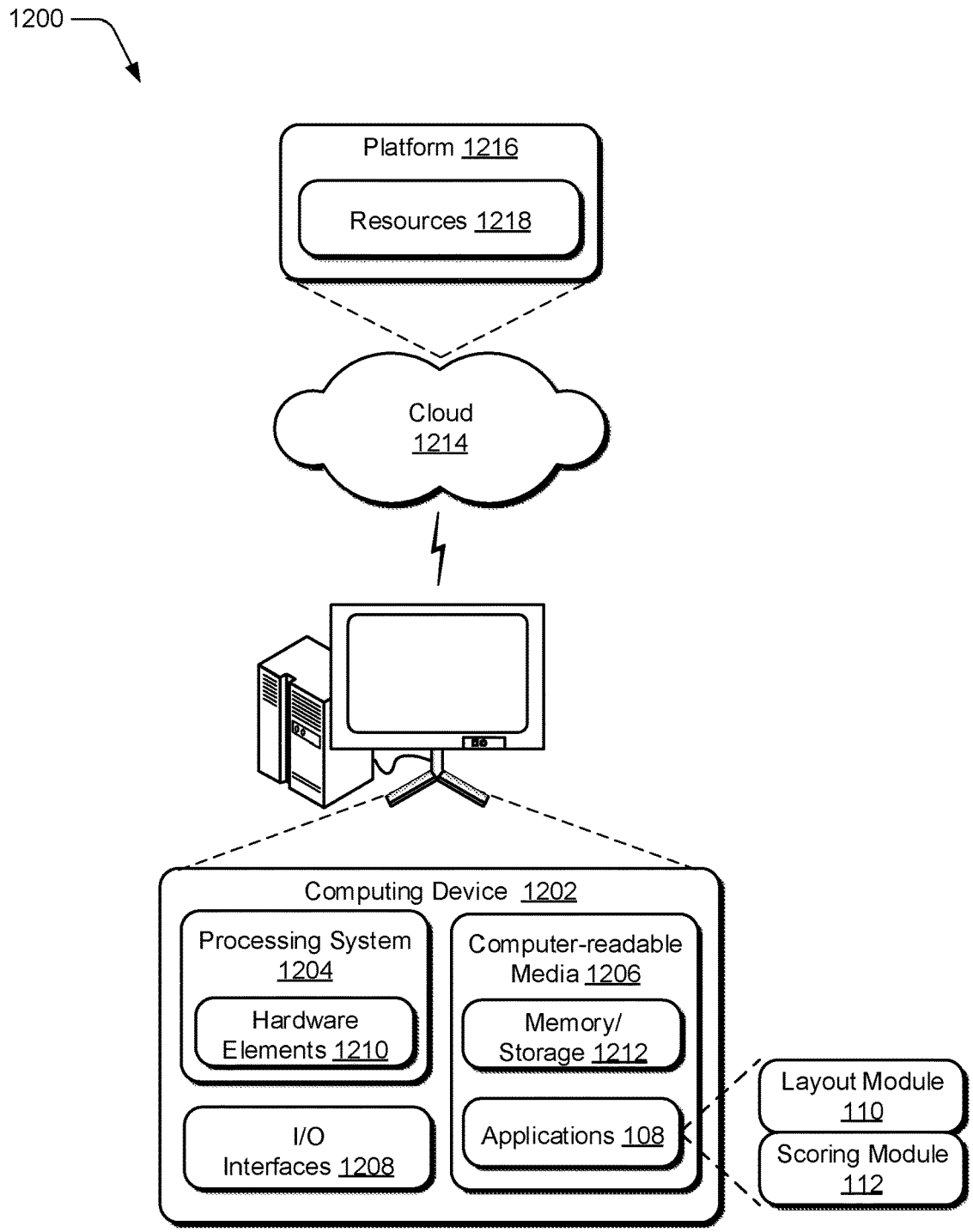
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the applications 108 and, in particular, the layout module 110 and the scoring module 112, which operate as described above. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. Other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" (also referred to as "computer-readable storage memory") may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate responsive grid layouts for graphic design, a system comprising:
    a layout module implemented at least partially in hardware of at least one computing device to:
        generate, automatically and without user intervention, a plurality of grid layouts, the plurality of grid layouts having, respectively, at least one cell configured to be mapped to at least one design element of digital content, and the plurality of grid layouts including a first grid layout that includes a first cell having first digital content and a second cell having second digital content, the first digital content including different content than the second digital content;
    a scoring module implemented at least partially in the hardware to automatically and without user intervention:
        perform a comparison of the first digital content and the second digital content in the first grid layout to the first digital content and the second digital content in one or more other grid layouts of the plurality of grid layouts; and
        assign scores to the plurality of grid layouts based on aesthetic criteria and layout heuristics determined based on the comparison; and
    an output module implemented at least partially in the hardware to output, automatically and without user intervention, in a user interface, the first grid layout of the plurality of grid layouts for recommendation to a user based on the scores, wherein the layout module is further implemented to:
        receive, after output of the first grid layout, user input to select a second grid layout that includes fewer cells than the first grid layout;
        determine, based on the first digital content in the first cell being visually aligned with the second digital content in the second cell in the first grid layout, that the first digital content and the second digital content are to be grouped together in a third cell of the second grid layout;
        move the first digital content and the second digital content from the first cell and the second cell of the first grid layout, respectively, to the third cell of the second grid layout; and reformat one or more of the first digital content or the second digital content to fit into the third cell.

2. The system as described in claim 1, wherein the layout module is further configured to group a subset of design elements of the digital content and maintain the group in a cell of the second grid layout.

3. The system as described in claim 1, wherein the aesthetic criteria includes at least one of symmetry, cell aspect ratio, text density in a cell, or alignment of design elements.

4. The system as described in claim 1, wherein the first digital content and the second digital content includes a plurality of design elements, wherein the layout module is further configured to determine a relative layout of a subset of the plurality of design elements to be placed within a cell of a grid layout of the plurality of grid layouts.

5. The system as described in claim 1, wherein the plurality of grid layouts includes a third grid layout having a same number of cells as the second grid layout, and wherein the third grid layout includes a different orientation of cells than the second grid layout.

6. The system as described in claim 1, wherein the layout module is further configured to, responsive to a user input changing an aspect ratio of a displayed grid layout, automatically generate a new grid layout for display for the digital content of the displayed grid layout if the aesthetic criteria of the displayed grid layout is not met.

7. The system as described in claim 1, wherein the layout module is further configured to combine design elements from multiple cells into a single cell and generate a cell layout of the design elements within the single cell.

8. The system as described in claim 1, wherein the layout module is further configured to divide a group of design elements in a single cell into a plurality of groups each positioned within a different cell.

9. In a digital medium environment to generate responsive grid layouts for graphic design, a method implemented by at least one computing device, the method comprising:
 displaying, by the at least one computing device, a first grid layout of a graphic design that includes a first cell adjacent a second cell and a third cell, the third cell including an instance of content in the first grid layout;
 receiving, by the at least one computing device, user input selecting a second grid layout that has fewer cells than the first grid layout;
 dynamically modifying, automatically and by the at least one computing device, the first grid layout to generate the second grid layout by combining digital content from the first cell and the second cell into a fourth cell that represents a foreground cell in the second grid layout that overlaps the third cell in the second grid layout such that digital content displayed in the fourth cell at least partially visually occludes, in the second grid layout, the instance of content displayed in the third cell;
 comparing, by the at least one computing device, at least one visual parameter of the digital content displayed in the fourth cell to at least one visual parameter of the digital content displayed in the third cell; and
 modifying, by the at least one computing device and based on said comparing, the at least one visual parameter of the digital content displayed within the fourth cell and the at least one visual parameter of the digital content displayed within the third cell.

10. The method as described in claim 9, wherein the act of automatically modifying the first grid layout is performed in real time.

11. The method as described in claim 9, wherein the fourth cell is dynamically modified by changing an aspect ratio of the fourth cell.

12. The method as described in claim 11, wherein said modifying comprises changing an aspect ratio of the third cell relative to the change in the aspect ratio of the fourth cell.

13. The method as described in claim 9, wherein the at least one visual parameter of the digital content displayed in the fourth cell includes at least one of size, alignment, spacing, or position of the digital content displayed in the fourth cell.

14. The method as described in claim 9, wherein at least one of the digital content displayed in the third cell or the digital content displayed in the fourth cell includes one or more of text, an image, or a video.

15. The method as described in claim 9, further comprising dynamically updating the digital content displayed in the third cell or the digital content displayed in the fourth cell based on a change to a size of the second grid layout or a change from the second grid layout to a different grid layout.

16. The method as described in claim 9, wherein said distributing the first digital content comprises dividing the first digital content into groups, and distributing the groups across the first cell and the second cell.

17. In a digital medium environment to generate responsive grid layouts for graphic design, a system comprising:
 means for generating, automatically and without user intervention, a plurality of grid layout suggestions using first digital content, the plurality of grid layout suggestions being based on scores assigned to the grid layout suggestions and including a first grid layout in which the first digital content is located within a first cell, and a second grid layout in which the first digital content is located in a second, different cell;
 means for scoring, automatically and without user intervention, each grid layout suggestion of the plurality of grid layouts by:
  comparing the first digital content in first cell according to the first grid layout to the first digital content in the second cell according to the second grid layout; and
  assigning, based on said comparing, the scores to the first grid layout and the second grid layout based on aesthetic criteria and layout heuristics of the first grid layout and the second grid layout;
 means for controlling output automatically and without user intervention, in a user interface, of the first grid layout based on the assigned score for the first grid layout; and
 means for receiving user input to the first grid layout moving the first digital content from the first cell to a third cell in the first grid layout, and automatically and in response to receiving the user input, causing the first digital content to be moved to the third cell, and second digital content within the third cell to be moved from the third cell to the first cell;
 means for determining that reformatting is disabled for the first digital content such that the first digital content is prevented from being reformatted when moved to the third cell; and
 means for reformatting the second digital content when moved to the first cell.

18. The system as described in claim 17, wherein the aesthetic criteria includes at least one of symmetry, cell aspect ratios, text density in a cell, or alignment of design elements of the digital content within a respective grid layout or within a cell of the respective grid layout.

19. The system as described in claim 17, further comprising:
- means for modifying, in real time, the first cell of the first grid layout responsive to a user input that changes a size of the first cell; and
- means for automatically modifying at least one parameter of the second digital content within the first cell based on the change to the size of the first cell.

20. The system as described in claim 19, further comprising:
- means for automatically modifying a size or position of the third cell based on the change to the size of the first cell; and
- means for automatically modifying at least one parameter of additional digital content displayed within the third cell based on the change to the size of the first cell.

* * * * *